H. MESSER.
MACHINE FOR CUTTING INDIA RUBBER INTO STRIPS.
No. 24,265. Patented May 31, 1859.
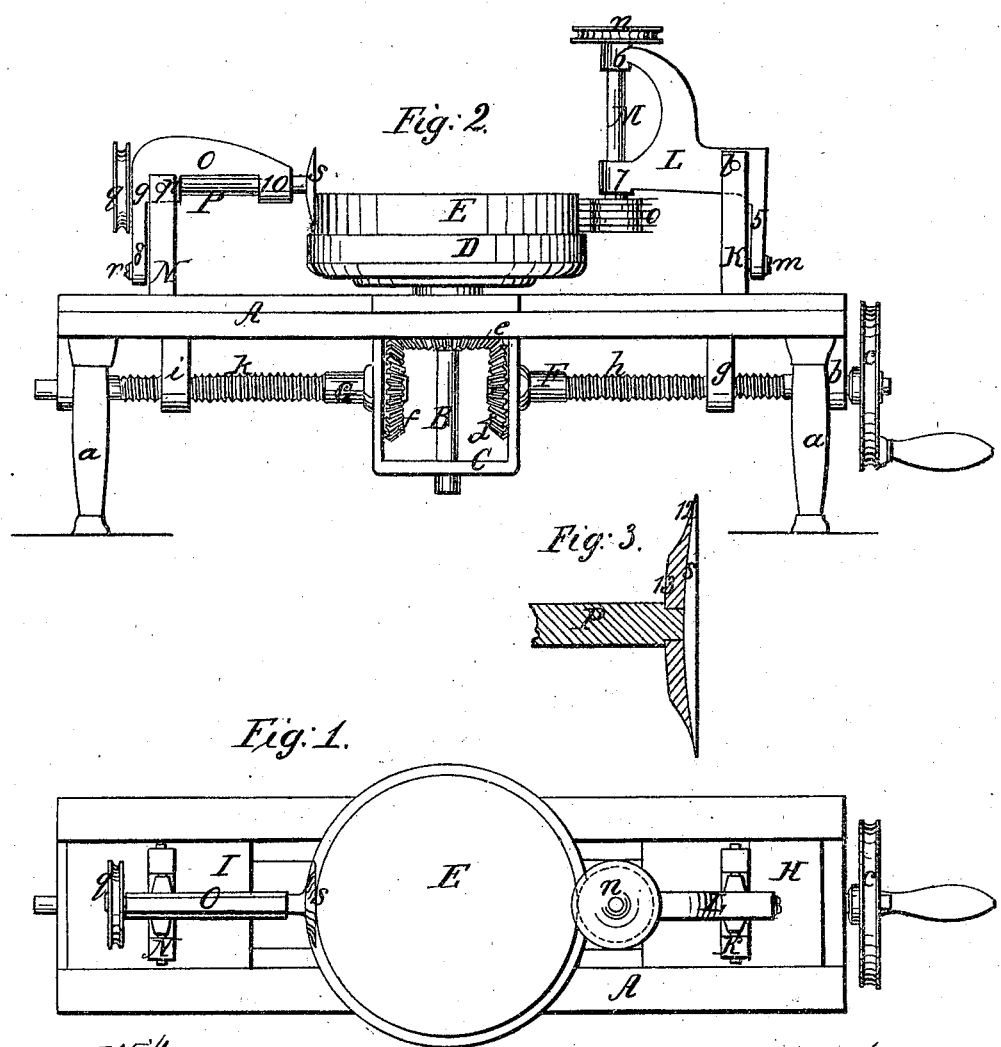

UNITED STATES PATENT OFFICE.

HENRY MESSER, OF ROXBURY, MASSACHUSETTS, ASSIGNOR TO CHARLES RICE, OF BOSTON, MASSACHUSETTS.

MACHINE FOR CUTTING INDIA-RUBBER INTO THREADS.

Specification of Letters Patent No. 24,265, dated May 31, 1859.

*To all whom it may concern:*

Be it known that I, HENRY MESSER, of Roxbury, in the county of Norfolk and State of Massachusetts, have invented a new and Improved Machine for Cutting India-Rubber into Threads, of which the following is a full, clear, and exact description, reference being had to the accompanying drawings, making part of this specification, in which—

Figure 1 is a plan of the machine. Fig. 2 is a side elevation of the same; Fig. 3, detail to be referred to thereafter.

That others skilled in the art may understand and use any invention I will proceed to describe the manner in which I have carried out the same.

In the drawings A is the bed of the machine; supported on legs $a$. Through the middle of this bed passes a vertical shaft B which has its lower bearing in a frame C pendent from the lower side of the bed A. This shaft carries a revolving table D on which is secured a block E of India rubber from which the threads are to be cut. The shaft B and table D are revolved in the following manner: A horizontal shaft F which has its bearings in one side of the frame C and in a piece $b$ projecting down from the bed A, carries at one end a pulley $c$ by which it is driven by a suitable band (the several bands which drive the various parts of the machine not being shown in the drawings) and at the other end a beveled gear $d$ which engages with a corresponding gear $e$ on the shaft B. Another shaft G, having bearings similar to the shaft F carries at one end a beveled gear $f$ which also engages with the gear $e$.

A carriage H near one end of the machine, and a corresponding carriage I near the other end of it, slide in suitable dovetailed grooves in the top of the bed A, and are caused to approach toward and recede from the center of the revolving carriage D in the following manner: A nut $g$ projecting down from the carriage H through a slot in the bed A embraces a screw $h$ on the shaft F and a similar nut $i$ attached to the carriage I embraces the screw $k$ on the shaft G. The screws $h$ and $k$ are so cut that as the pulley $c$ is driven in one direction the carriages H and I shall approach, and when driven in the opposite direction they shall recede from each other. A standard K which rises from the carriage H has pivoted at $l$ at its upper end an arm L, one portion of which hangs down at 5 alongside the standard and is swung in and out by a set screw $m$ at its lower end; the other or larger portion of this arm serves as bearings 6 and 7 for a vertical shaft M which is driven rapidly by a pulley $n$ on the top of it, and carries at its lower end a series of circular cutters $o$ composed of thin plates of steel, with washers between them and which are revolved in horizontal planes parallel to the top of the carriage D. The washers between the plates $o$ serve to keep them at the required distance apart, the thickness of the threads in one direction being thus regulated. Any required number of these cutters may be employed, to correspond with the thickness of the block of rubber E to be cut; the upper one of the series being set to cut as much below the upper surface of the block E as will be required for the thickness of a thread while the lower cutter revolves in a plane a little above the upper surface of the carriage D.

As the carriage D is revolved as before stated the cutters $o$ are revolved rapidly in contact with the block of rubber E, and cut into its edge as it is revolved, the carriage H being at the same time fed toward the center of the machine by the screw $h$. The set screw $m$ serves to adjust the cutters $o$ in their proper planes. Another standard N rises from the carriage I and has pivoted to its top at $p$ an arm O having a pendent portion 8 and a set screw $r$. This arm carries in bearings 9 and 10 a horizontal shaft P driven by a pulley $q$ on the end of it. This shaft lies in a vertical plane passing through the center of the carriage D, and is adjusted with reference to a horizontal plane, by means of the set screw $r$; it carries at its inner end, or that next the center of the machine a circular cutter $s$ of a peculiar form shown in section in Fig. 3 which revolves in a plane perpendicular to the cutters $o$ and cuts through the block of rubber E from its upper surface down to the carriage D. It may however be set so as not to cut entirely down to the surface of the carriage D as it would deface it, and as there is a thin film of rubber left below the lower cutter $o$ which it is not requisite for the cutter $s$ to pass through. This cutter is also approached toward the center of the machine by the revolutions of the screw *k* at the same time that the block of rubber is revolved, it thus cuts in a continuous spiral around the edge of the block E forming a ribbon which has been previously split by the cutters *o* into a number of fine threads of an uniform size. When the cutters *s* and *o* have approached sufficiently near to the center of the carriage D the direction of the pulley *c* is reversed and they are run back ready to have another block E of rubber placed on the carriage D.

The speed at which the carriages H and I are fed up is made proportionate to the revolutions of the carriage D and to the thickness of thread required; this may be done by changing the screws and nuts.

The cutters *o* are only required to enter the edge of the block E sufficiently far to cut through that portion of it which will be taken off in a ribbon by the cutter *s* as the block revolves around to it. The cutters are kept wet in any customary and well known way.

The cutter *s* as before stated is of a peculiar form (see Fig. 3) the face of it next to the block of rubber is made concave, and the edge is ground up from the back at 12 quite thin, while the more central portion 13 near where it is secured to the shaft is much thicker; the concave face offers much less resistance in cutting as the edge only is in immediate contact with the solid rubber, and the amount of metal left near the center enables me to temper the edge without distorting the cutter.

With the above described machine I am enabled to cut from the crude rubber, threads of almost any required length and size.

The cutter *s* will sometimes operate better by having the shaft P placed a little back from a line passing through the center of the block to be cut.

The cutters *o* are spoken of as having the upper one arranged to cut a definite distance from the top of the block E but as the blocks of rubber will vary in thickness and are sometimes uneven on their upper surface, I employ cutters enough to suit the thickest blocks generally used, when some one of the cutters will level off the top of it, and the others below will cut the threads, as before described.

What I claim as my invention and desire to secure by Letters Patent is—

The arrangement and combination of the rotating table D and the adjustable cutters (*o*) (*s*), substantially as and for the purposes herein shown and described.

HENRY MESSER.

Witnesses:
 Thos. R. Roach,
 Thos. L. Glover.